United States Patent
Hatano

(10) Patent No.: US 8,579,386 B2
(45) Date of Patent: Nov. 12, 2013

(54) VEHICLE BRAKE DEVICE

(75) Inventor: Kunimichi Hatano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 13/376,207

(22) PCT Filed: Jun. 9, 2010

(86) PCT No.: PCT/JP2010/059769
§ 371 (c)(1),
(2), (4) Date: Dec. 21, 2011

(87) PCT Pub. No.: WO2010/143660
PCT Pub. Date: Dec. 16, 2010

(65) Prior Publication Data
US 2012/0145494 A1    Jun. 14, 2012

(30) Foreign Application Priority Data
Jun. 12, 2009   (JP) ................................. 2009-141605

(51) Int. Cl.
*B60T 15/14*    (2006.01)

(52) U.S. Cl.
USPC ..................... 303/116.2; 303/113.5

(58) Field of Classification Search
USPC .......... 303/113.4, 114.1, 114.3, 115.1, 115.2, 303/116.2, 116.4, 122, 122.03, 122.05, 303/122.09–122.14; 188/151 R, 152, 358
See application file for complete search history.

(56) References Cited

U.S. PATENT DOCUMENTS

| | | | |
|---|---|---|---|
| 5,026,126 A * | 6/1991 | Umasankar et al. | 303/162 |
| 5,161,865 A * | 11/1992 | Higashimata et al. | 303/115.2 |
| 6,315,370 B1 | 11/2001 | Feigel et al. | |
| 6,604,795 B2 | 8/2003 | Isono et al. | |
| 7,651,176 B2 * | 1/2010 | Inoue et al. | 303/114.1 |
| 7,823,985 B2 * | 11/2010 | Hatano | 303/115.2 |
| 8,010,269 B2 * | 8/2011 | Toyohira et al. | 701/70 |
| 8,226,176 B2 * | 7/2012 | Hatano | 303/122.13 |
| 8,231,181 B2 * | 7/2012 | Hatano | 303/3 |
| 8,303,047 B2 * | 11/2012 | Hatano et al. | 303/113.5 |
| 8,328,297 B2 * | 12/2012 | Hatano | 303/115.1 |

(Continued)

FOREIGN PATENT DOCUMENTS

| | | |
|---|---|---|
| CN | 1374218 A | 10/2002 |
| JP | 2002-255021 A | 9/2002 |
| JP | 2008-110633 A | 5/2008 |
| WO | 2008/122469 A1 | 10/2008 |

*Primary Examiner* — Christopher Schwartz
(74) *Attorney, Agent, or Firm* — Carrier Blackman & Associates, P.C.; Joseph P. Carrier; Michael J. McCandlish

(57) ABSTRACT

A VSA device (24), which controls vehicle behavior by individually controlling the pressure of brake fluid supplied from a slave cylinder (23) to a wheel cylinder (16, 17; 20, 23), is provided with: an accumulator (62) which can be connected to the wheel cylinder and the slave cylinder (23); an out-valve (60, 61) disposed on a fluid path between the wheel cylinder and the accumulator (62); a check valve (63) that allows only flow of brake fluid from the accumulator (62) to the slave cylinder (23); and a regulator valve (54) disposed on a fluid path between the wheel cylinder and a path between the check valve (63) and the slave cylinder (23). Brake fluid is discharged from the accumulator (62) to the slave cylinder (23) by reducing the driving force of an electric motor (32) of the slave cylinder (23), thereby rendering a special pump unnecessary and making it possible to reduce the weight, cost, and component count.

8 Claims, 4 Drawing Sheets

(56) References Cited

U.S. PATENT DOCUMENTS

| | | | |
|---|---|---|---|
| 8,333,442 B2* | 12/2012 | Hatano et al. | 303/115.1 |
| 2002/0084693 A1* | 7/2002 | Isono et al. | 303/113.1 |
| 2003/0201669 A1 | 10/2003 | Yokoyama et al. | |
| 2007/0278855 A1* | 12/2007 | Hatano | 303/116.1 |
| 2008/0079309 A1* | 4/2008 | Hatano et al. | 303/113.5 |
| 2008/0223675 A1* | 9/2008 | Hatano | 188/345 |
| 2008/0290726 A1* | 11/2008 | Inoue et al. | 303/15 |
| 2009/0095100 A1* | 4/2009 | Toyohira et al. | 74/110 |
| 2009/0179483 A1* | 7/2009 | Hatano | 303/3 |
| 2010/0001577 A1* | 1/2010 | Hatano | 303/3 |
| 2010/0219679 A1* | 9/2010 | Toyohira et al. | 303/20 |
| 2011/0285200 A1* | 11/2011 | Hatano et al. | 303/6.01 |
| 2012/0000738 A1* | 1/2012 | Inoue et al. | 188/106 P |
| 2012/0228924 A1* | 9/2012 | Hatano et al. | 303/6.01 |

* cited by examiner

UNDER NORMAL CONDITION

UNDER ABNORMAL CONDITION

VEHICLE BRAKE DEVICE

TECHNICAL FIELD

The present invention relates to a vehicle brake device including: a wheel cylinder provided to a wheel and configured to generate a braking force by using a brake fluid pressure; electric brake-fluid-pressure generation means for generating a brake fluid pressure to be supplied to the wheel cylinder, by being operated by an electric motor; and brake-fluid-pressure control means for controlling vehicle behavior by individually controlling the brake fluid pressure supplied to the wheel cylinder, the brake-fluid-pressure control means being disposed between the electric brake-fluid-pressure generation means and the wheel cylinder.

BACKGROUND ART

Such a vehicle brake device is known from Patent Document 1 below.

This vehicle brake device includes an ABS (anti-lock braking system) device between a slave cylinder and wheel cylinders for shortening a braking distance by preventing the locking of a wheel. This ABS device includes: in-valves for controlling supply of a brake fluid to the wheel cylinders; out-valves for controlling discharge of the brake fluid from the wheel cylinders; accumulators for temporarily storing the brake fluid discharged from the wheel cylinders; pumps for discharging the brake fluid stored in the accumulators; and the like.

Patent Document 1: Japanese Patent Application Laid-open No. 2008-110633

DISCLOSURE OF THE INVENTION

Problem to be Solved by the Invention

Incidentally, the above-described conventional device requires the pumps for discharging the brake fluids stored in the accumulators. For this reason, there is a problem that the number of components, the weight and the costs are increased by the pumps.

The present invention has been made in view of the above-described circumstances, and an object thereof is to enable discharge of a brake fluid from an accumulator of brake-fluid-pressure control means of a vehicle brake device with no need for a pump.

Means for Solving the Problems

In order to attain the above object, according to a first aspect of the present invention, there is proposed a vehicle brake device including: a wheel cylinder provided to a wheel and configured to generate a braking force by using a brake fluid pressure; electric brake-fluid-pressure generation means for generating a brake fluid pressure to be supplied to the wheel cylinder, by being operated by an electric motor; and brake-fluid-pressure control means for controlling vehicle behavior by individually controlling the brake fluid pressure supplied to the wheel cylinder, the brake-fluid-pressure control means being disposed between the electric brake-fluid-pressure generation means and the wheel cylinder, characterized in that the brake-fluid-pressure control means includes: an accumulator capable of communicating with the wheel cylinder and the electric brake-fluid-pressure generation means; a first electromagnetic valve configured to switch a communication state of a fluid path that connects the wheel cylinder to the accumulator; and a check valve configured to allow only flowing of a brake fluid from the accumulator to the electric brake-fluid-pressure generation means, and the brake fluid is discharged from the accumulator to the electric brake-fluid-pressure generation means by reducing a driving force of the electric motor of the electric brake-fluid-pressure generation means.

Furthermore, according to a second aspect of the present invention, in addition to the first aspect, there is proposed the vehicle brake device, further comprising a second electromagnetic valve configured to switch a communication state of a fluid path that connects a path between the check valve and the electric brake-fluid-pressure generation means to the wheel cylinder, wherein the brake-fluid-pressure control means maintains the brake fluid pressure constant during opening and closing of the first electromagnetic valve and the second electromagnetic valve.

Moreover, according to a third aspect of the present invention, in addition to the first aspect, there is proposed the vehicle brake device, wherein the electric brake-fluid-pressure generation means includes a slave cylinder configured to generate a brake fluid pressure by driving a piston by using the electric motor, and controls the brake fluid pressure by changing a position of the piston.

Furthermore, according to a fourth aspect of the present invention, in addition to the first aspect, there is proposed the vehicle brake device, wherein the brake-fluid-pressure control means includes: an in-valve disposed between the electric brake-fluid-pressure generation means and the wheel cylinder; and an out-valve disposed between the wheel cylinder and the accumulator, and the electric brake-fluid-pressure generation means reduces the driving force of the electric motor when the in-valve and the out-valve are both closed.

Moreover, according to a fifth aspect of the present invention, in addition to the first aspect, there is proposed the vehicle brake device, wherein the electric brake-fluid-pressure generation means is connected to a plurality of the wheel cylinders, and the vehicle brake device includes a second electromagnetic valve configured to cut the connection between the plurality of wheel cylinders and the electric brake-fluid-pressure generation means when the driving force of the electric motor is reduced.

Furthermore, according to a sixth aspect of the present invention, in addition to the first aspect, there is proposed the vehicle brake device, further comprising determination means for determining discharge of a brake fluid pressure to the electric brake-fluid-pressure generation means.

Here, a slave cylinder 23 in an embodiment corresponds to the electric brake-fluid-pressure generation means of the present invention; a VSA system 24 in the embodiment corresponds to the brake-fluid-pressure control means of the present invention; a regulator valve 54 and in-valves 56 and 58 in the embodiment correspond to the second electromagnetic valve of the present invention; out-valves 60 and 61 in the embodiment correspond to the first electromagnetic valve of the present invention; and a motor current sensor Sd in the embodiment corresponds to the determination means of the present invention.

Effects of the Invention

According to the first aspect of the present invention, the brake-fluid-pressure control means individually controls the brake fluid pressures, supplied to the wheel cylinder from the electric brake-fluid-pressure generation means, so as to control vehicle behavior, and includes: the accumulator capable of communicating with the wheel cylinder and the electric brake-fluid-pressure generation means; the first electromagnetic valve configured to switch a communication state of a fluid path that connects the wheel cylinder to the accumulator; and the check valve configured to allow only flowing of a brake fluid from the accumulator to the electric brake-fluid-pressure generation means. Here, the brake fluid is discharged from the accumulator to the electric brake-fluid-pressure generation means by reducing a driving force of the electric motor of the electric brake-fluid-pressure generation means. For this reason, it is possible to eliminate a need for a specific pump and thus to reduce the number of components, the weight and the costs.

Moreover, according to the second aspect of the present invention, the vehicle brake device includes the second electromagnetic valve configured to switch a communication state of a fluid path that connects a path between the check valve and the electric brake-fluid-pressure generation means to the wheel cylinder. Here, the brake-fluid-pressure control means maintains the brake fluid pressures constant during opening and closing of the first electromagnetic valve and the second electromagnetic valve. For this reason, it is possible to accurately perform operation to increase, decrease and maintain a pressure in VSA control or ABS control.

Further, according to the third aspect of the present invention, the electric brake-fluid-pressure generation means includes a slave cylinder configured to drive the piston by the electric motor and thus to generate a brake fluid pressure, and controls the brake fluid pressure by changing a position of the piston. For this reason, it is possible to generate a desired brake fluid pressure with high accuracy without any pulsation.

Furthermore, according to the fourth aspect of the present invention, the brake-fluid-pressure control means includes: the in-valve disposed between the electric brake-fluid-pressure generation means and the wheel cylinder; and the out-valve disposed between the wheel cylinder and the accumulator. For this reason, it is possible to perform a VSA function or an ABS function by individually controlling the brake fluid pressure of the wheel cylinder. In addition, the electric brake-fluid-pressure generation means reduces a driving force of the electric motor when the in-valve and the out-valve are both closed. For this reason, it is possible to reduce the pressure of the accumulator without any influence on the brake fluid pressure of the wheel cylinder.

In addition, according to the fifth aspect of the present invention, the electric brake-fluid-pressure generation means is connected to the plurality of wheel cylinders, and the connection between the plurality of wheel cylinders and the electric brake-fluid-pressure generation means is cut off by second electromagnetic valves when a driving force of the electric motor is reduced. For this reason, it is possible to reduce the pressure of the accumulator by reliably causing a negative pressure generated by the electric brake-fluid-pressure generation means to act on the accumulator.

Besides, according to the sixth aspect of the present invention, the vehicle brake device includes determination means for determining discharge of a brake fluid pressure to the electric brake-fluid-pressure generation means. For this reason, it is possible to reliably determine that the pressure of the accumulator is reduced.

EXPLANATION OF REFERENCE NUMERALS AND SYMBOLS

16 Wheel cylinder
17 Wheel cylinder
20 Wheel cylinder
21 Wheel cylinder
23 Slave cylinder (electric brake-fluid-pressure generation means)
24 VSA system (brake-fluid-pressure control means)
32 Electric motor
38A Piston
38B Piston
54 Regulator valve (second electromagnetic valve)
56 In-valve (second electromagnetic valve)
58 In-valve (second electromagnetic valve)
60 Out-valve (first electromagnetic valve)
61 Out-valve (first electromagnetic valve)
62 Accumulator
63 Check valve
Sd Motor rotation angle sensor (determination means)

BEST MODE FOR CARRYING OUT THE INVENTION

An embodiment of the present invention is explained below based on FIGS. 1 to 4.

First Embodiment

Figure 1:
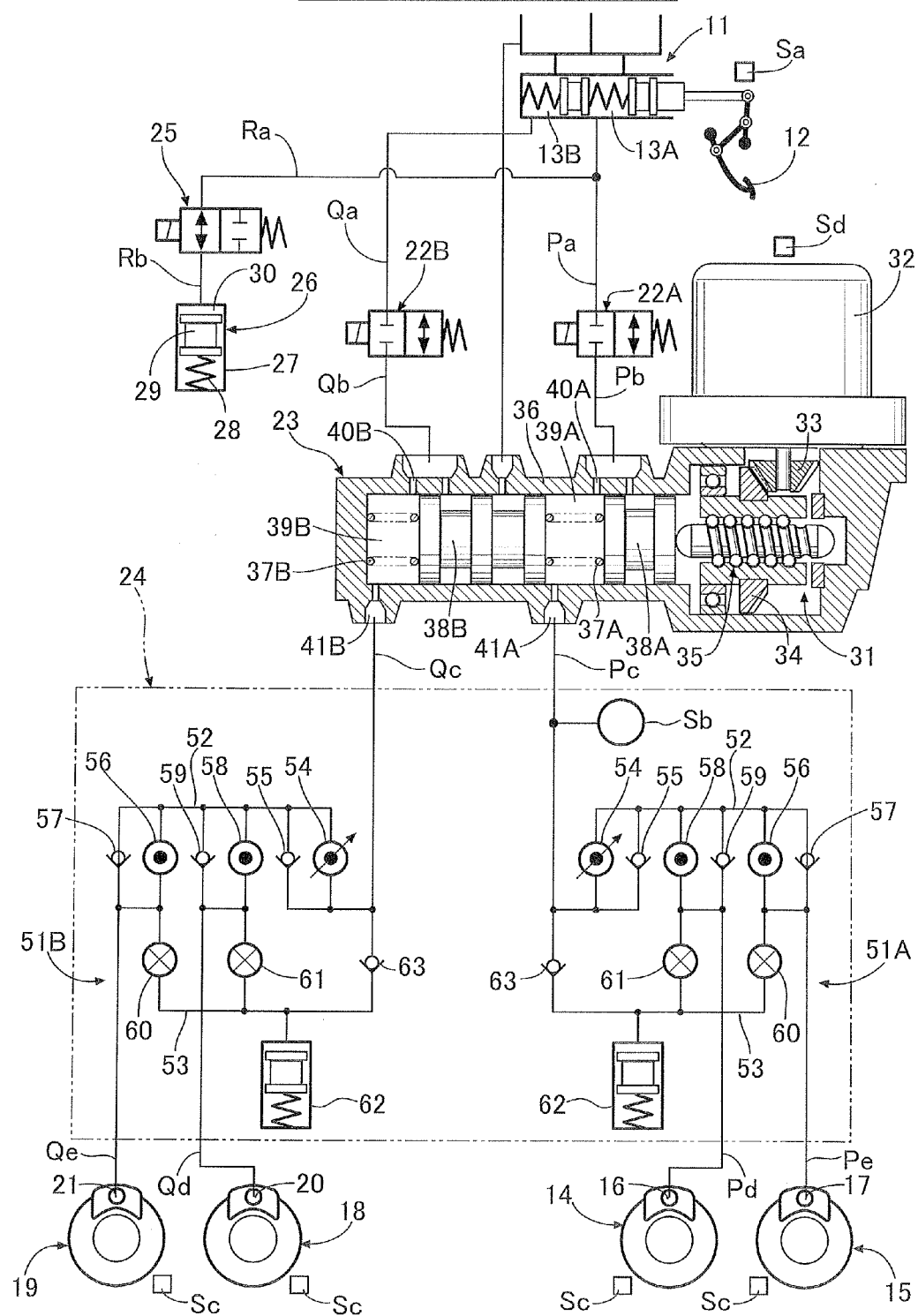
FIG. 1 is a diagram of a fluid pressure circuit of a vehicle brake device under a normal condition. (first embodiment)

As shown in FIG. 1, a tandem master cylinder 11 includes rear and front fluid pressure chambers 13A and 13B that output a brake fluid pressure corresponding to a depressing force from a driver depressing a brake pedal 12, the rear fluid pressure chamber 13A is connected to, for example, wheel cylinders 16 and 17 of disk brake devices 14 and 15 of a left front wheel and a right rear wheel via fluid paths Pa, Pb, Pc, Pd, and Pe (first system), and the front fluid pressure chamber 13B is connected to, for example, wheel cylinders 20 and 21 of disk brake devices 18 and 19 of a right front wheel and a left rear wheel via fluid paths Qa, Qb, Qc, Qd, and Qe (second system).

A cut-off valve 22A, which is a normally open electromagnetic valve, is disposed between the fluid paths Pa and Pb, a cut-off valve 22B, which is a normally open electromagnetic valve, is disposed between the fluid paths Qa and Qb, a slave cylinder 23 is disposed between the fluid paths Pb and Qb and the fluid paths Pc and Qc, and a VSA (vehicle stability assist) system 24, which also serves as the function of ABS (anti-lock braking system), is disposed between the fluid paths Pc and Qc and the fluid paths Pd and Pe; Qd and Qe.

A stroke simulator 26 is connected to fluid paths Ra and Rb branching from the fluid path Pa via a reaction force allowing valve 25, which is a normally closed electromagnetic valve. The stroke simulator 26 is one in which a piston 29 urged by means of a spring 28 is slidably fitted into a cylinder 27, and a fluid pressure chamber 30 formed on the opposite side of the piston 29 to the spring 28 communicates with the fluid path Rb.

An actuator 31 of the slave cylinder 23 includes an electric motor 32, a drive bevel gear 33 provided on an output shaft thereof, a driven bevel gear 34 meshing with the drive bevel gear 33, and a ball screw mechanism 35 that is operated by the driven bevel gear 34. The slave cylinder 23 is operable to carry out a brake-by-wire braking operation under normal operating conditions, as illustrated in FIG. 1 and as further described herein.

A rear piston 38A and a front piston 38B urged in the backward direction by return springs 37A and 37B respectively are slidably disposed in a rear part and a front part of a cylinder main body 36 of the slave cylinder 23, and a rear fluid pressure chamber 39A and a front fluid pressure chamber 39B are defined in front of the rear piston 38A and the front piston 38B respectively.

The rear fluid pressure chamber 39A communicates with the fluid path Pb via a rear input port 40A and communicates with the fluid path Pc via a rear output port 41A, and the front fluid pressure chamber 39B communicates with the fluid path Qb via a front input port 40B and communicates with the fluid path Qc via a front output port 41B.

In FIG. 1, when the electric motor 32 is driven in one direction, the rear and front pistons 38A and 38B are moved forward via the drive bevel gear 33, the driven bevel gear 34, and the ball screw mechanism 35. Accordingly, a brake fluid pressure is generated in the rear and front fluid pressure chambers 39A and 39B, thus enabling the brake fluid pressure to be outputted to the fluid paths Pc and Qc via the rear and front output ports 41A and 41B.

The structure of the VSA system 24 is known and employs the same structure for a first brake actuator 51A for controlling the first system of the disk brake devices 14 and 15 for the left front wheel and the right rear wheel and for a second brake actuator 51B for controlling the second system of the disk brake devices 18 and 19 for the right front wheel and the left rear wheel.

The first brake actuator 51A for the first system of the disk brake devices 14 and 15 for the left front wheel and the right rear wheel is explained below as being representative thereof.

The first brake actuator 51A is disposed between the fluid path Pc communicating with the rear output port 41A of the slave cylinder 23 positioned on the upstream side and the fluid paths Pd and Pe communicating respectively with the wheel cylinders 16 and 17 of the left front wheel and the right rear wheel positioned on the downstream side.

The first brake actuator 51A includes a fluid path 52 and a fluid path 53 in common for the wheel cylinders 16 and 17 of the left front wheel and the right rear wheel, and includes a regulator valve 54, which is a normally open electromagnetic valve with a variable degree of opening, disposed between the fluid path Pc and the fluid path 52, a check valve 55 disposed in parallel to the regulator valve 54 and allowing flow of brake fluid from the fluid path Pc side to the fluid path 52 side, an in-valve 56, which is a normally open electromagnetic valve, disposed between the fluid path 52 and the fluid path Pe, a check valve 57 disposed in parallel to the in-valve 56 and allowing flow of brake fluid from the fluid path Pe side to the fluid path 52 side, an in-valve 58, which is a normally open electromagnetic valve, disposed between the fluid path 52 and the fluid path Pd, a check valve 59 disposed in parallel to the in-valve 58 and allowing flow of brake fluid from the fluid path Pd side to the fluid path 52 side, an out-valve 60, which is a normally closed electromagnetic valve, disposed between the fluid path Pe and the fluid path 53, an out-valve 61, which is a normally closed electromagnetic valve, disposed between the fluid path Pd and the fluid path 53, an accumulator 62 connected to the fluid path 53, and a check valve 63 disposed between the fluid path 53 and the fluid path 52 and allowing flow of brake fluid from the fluid path 53 side to the fluid path 52 and the slave cylinder 23 side.

Specifically, the VSA system 24 of this embodiment includes no pump to send a brake fluid stored in the accumulator 62 back to the slave cylinder 23 side. The accumulator 62 is in communication with the slave cylinder 23 through the check valve 63.

To the brake pedal 12, a stroke sensor Sa for detecting a stroke of the brake pedal 12 is provided. A fluid pressure sensor Sb for detecting a brake fluid pressure generated by the slave cylinder 23 is provided to the fluid path Pc on one entrance side of the VSA system 24. Vehicle speed sensors Sc are provided respectively to the four wheels. To the electric motor 32, a rotation angle sensor Sd for detecting its rotation angle is provided.

Next, operations of the embodiment of the present invention including the above-described configuration will be described.

In a normal state where the system operates normally, the cut-off valves 22A and 22B, which are normally open electromagnetic valves, are closed by being energized, and the reaction force allowing valve 25, which is a normally closed electromagnetic valve, is opened by being energized, as shown in FIG. 1. When the stroke sensor Sa detects, in this state, that the driver is depressing the brake pedal 12, the electric motor 32 of the slave cylinder 23 starts to operate, the rear and front pistons 38A and 38B advance, and thereby a brake fluid pressure is generated in each of the rear and front fluid pressure chambers 39A and 39B. These brake fluid pressures are transmitted to the wheel cylinders 16 and 17; 20 and 21 of the disk brake devices 14 and 15; 18 and 19 through the opened in-valves 56 and 56; 58 and 58 of the VSA system 24, to brake the wheels.

In this state, since the communication between the master cylinder 11 and the slave cylinder 23 is cut off by the cut-off valves 22A and 22B thus closed, a brake fluid pressure generated by the master cylinder 11 is not transmitted to the disk brake devices 14 and 15; 18 and 19. Accordingly, the brake fluid pressure generated in the fluid pressure chamber 13A of the master cylinder 11 is transmitted to the fluid pressure chamber 30 of the stroke simulator 26 through the opened reaction force allowing valve 25, to thereby move the piston 29 against the spring 28. This allows the brake pedal 12 to stroke, and can also resolve strange feeling experienced by the driver by generating a pseudo pedal reaction force.

Figure 3:
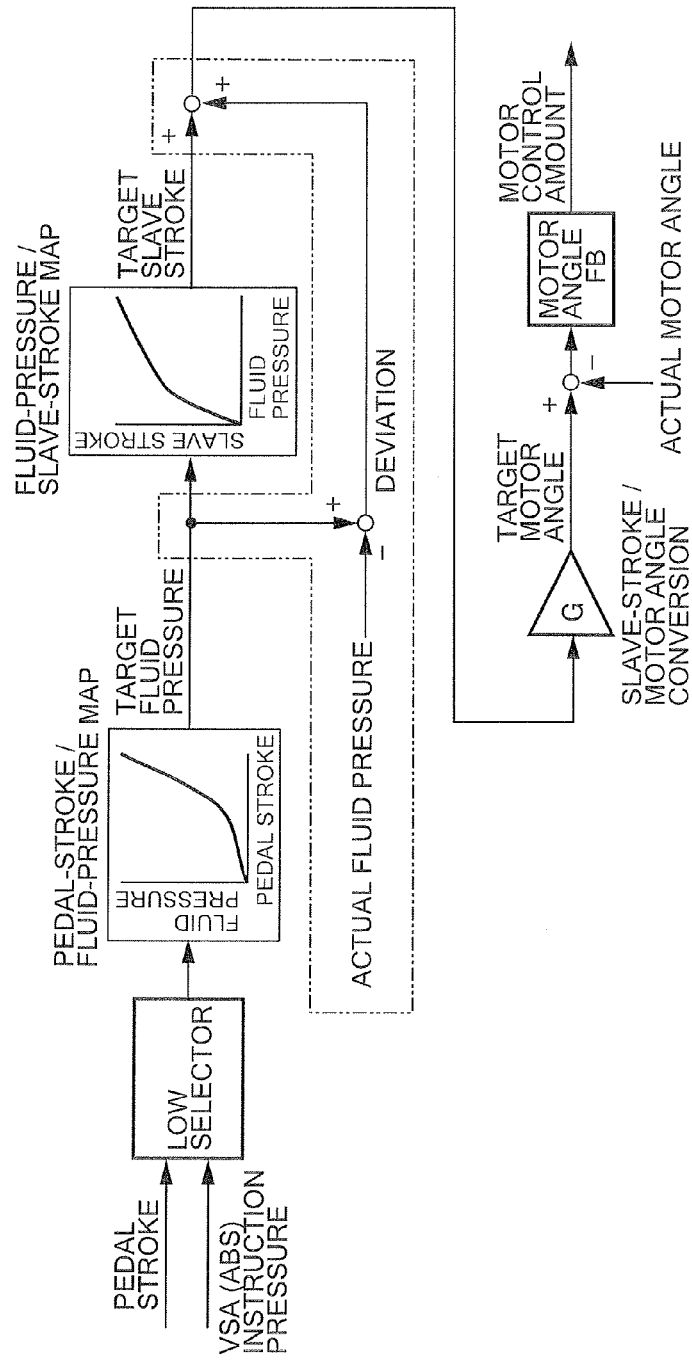
FIG. 3 is a block diagram of a control system of an electric motor of a slave cylinder. (first embodiment)

In this state, as shown in FIG. 3, a target fluid pressure is searched out based on a smaller one of the stroke, detected by the stroke sensor Sa, of the brake pedal 12, and a VSA (ABS) indicated value, by using a pedal-stroke/fluid-pressure map; a target stroke of the slave cylinder 23 is further searched out based on the target fluid pressure by using a fluid-pressure/slave-cylinder-stroke map; and the target stroke is converted to a target rotation angle of the electric motor 32 of the slave cylinder 23. Then, since a rotation angle of the electric motor 32 is controlled so as to make the deviation between an actual rotation angle of the electric motor 32 and the target rotation angle converge to zero, a fluid pressure corresponding to the stroke of the brake pedal 12 can be generated by the slave cylinder 23 and supplied to the wheel cylinders 16 and 17; 20 and 21.

Meanwhile, since the target stroke of the slave cylinder 23 is corrected by using a deviation between a target fluid pressure and an actual fluid pressure, it is possible to accurately perform operation to increase, decrease and maintain the pressure in VSA control and ABS control by causing the actual fluid pressure to accurately follow the target fluid pressure.

Next, operation of the VSA system 24 will be described based on FIG. 1.

In general, a pump operated by an electric motor generates a brake fluid pressure for causing the VSA system 24 to operate. However, since no such pump is included in this embodiment, the slave cylinder 23 generates a brake fluid pressure for causing the VSA system 24 to operate.

When the VSA system 24 is not in operation, the regulator valves 54 and 54 are opened by being deenergized, the in-valves 56 and 56; 58 and 58 are opened by being deenergized, and the out-valves 60 and 60; 61 and 61 are closed by being deenergized. Accordingly, when the driver depresses the brake pedal 12 for braking and the slave cylinder 23 starts to operate, brake fluid pressures are outputted from the rear and front output ports 41A and 41B of the slave cylinder 23. The brake fluid pressures are transmitted to the wheel cylinders 16 and 17; 20 and 21 through the regulator valves 54 and 54 and then the opened in-valves 56 and 56; 58 and 58, so that the four wheels can be braked.

When the VSA system 24 is in operation, the slave cylinder 23 is caused to operate in a state where the regulator valves 54 and 54 are opened by being deenergized, and a brake fluid pressure supplied from the slave cylinder 23 is transmitted to the in-valves 56 and 56; 58 and 58 through the regulator valves 54 and 54. Accordingly, the brake fluid pressure is selectively transmitted from the slave cylinder 23 to a predetermined one or more of the wheel cylinders 16 and 17; 20 and 21 through a predetermined one or more of the in-valves 56 and 56; 58 and 58 that are opened by being energized. For this reason, it is possible to individually control braking forces for the four wheels even when the driver is not depressing the brake pedal 12.

Meanwhile, to release the braking forces, generated as described above, of the predetermined one or more of the wheel cylinders 16 and 17; 20 and 21, the brake fluid pressures of the corresponding wheel cylinders 16 and 17; 20 and 21 may be let out to the accumulators 62, 62 by closing the in-valves 56 and 56; 58 and 58 and opening the out-valves 60 and 60; 61 and 61 corresponding to the predetermined one or more of the wheel cylinders 16 and 17; 20 and 21.

With the configuration, it is possible to individually control the braking forces for the four wheels by the first and second brake actuators 51A and 51B, to enhance turning performance by increasing braking forces of inner wheels during turning, and to enhance turning stability (directional stability) by increasing braking forces of outer wheels during turning.

Next, operation of ABS (anti-lock braking system) control using the VSA system 24 will be described.

Assume the case that if it is detected, based on outputs from the vehicle speed sensors Sc . . . , that the left front wheel, for example, comes to travel on a path having a low coefficient of friction and shows tendency to lock during braking by the driver depressing the brake pedal 12. In this case, one of the in-valves 58 of the first brake actuator 51A is energized and closed while one of the out-valves 61 is energized and opened, so that a brake fluid pressure in the wheel cylinder 16 for the left front wheel is let out to the corresponding accumulator 62 to reduce the pressure to a predetermined level. Thereafter, the out-valve 61 is deenergized and closed to maintain the brake fluid pressure in the wheel cylinder 16 for the left front wheel. As a result, when the tendency to lock the wheel cylinder 16 for the left front wheel is reduced, the in-valve 58 is deenergized and opened to supply a brake fluid pressure from the rear output port 41A of the slave cylinder 23 to the wheel cylinder 16 for the left front wheel and to thereby increase the pressure to a predetermine level. In this way, a braking force is increased.

If the left front wheel shows tendency to lock again as a consequence of this increase of the pressure, the above-described reduction of the pressure→maintenance of the pressure→increase of the pressure are repeated, to perform ABS control for minimizing a braking distance while preventing the locking of the left front wheel.

The descriptions have been given above of the ABS control for the case in which the wheel cylinder 16 for the left front wheel shows tendency to lock. However, a similar ABS control can be performed also in a case where any of the wheel cylinder 17 for the right rear wheel, the wheel cylinder 20 for the right front wheel and the wheel cylinder 21 for the left rear wheel shows tendency to lock.

As described above, when the VSA system 24 performs a VSA function or an ABS function for a long time, there is a possibility that the brake fluids discharged from the wheel cylinders 16 and 17; 20 and 21 having a reduced pressure are stored in the accumulators 62 and 62 and make the accumulators 62 and 62 full, so that pressure-reduction capability is reduced while the out-valves 60 and 60; 61 and 61 are opened. Accordingly, the brake fluids in the accumulators 62 and 62 need to be sent back to the slave cylinder 23 side. For this reason, the conventional VSA system 24 uses the pumps to draw the brake fluids in the accumulators 62 and 62. However, since no such pumps are included in the VSA system 24 of the present embodiment, the slave cylinder 23 is caused to perform the functions of the aforementioned pumps, and the brake fluids in the accumulators 62 and 62 are thus sent back to the slave cylinder 23.

Figure 4:
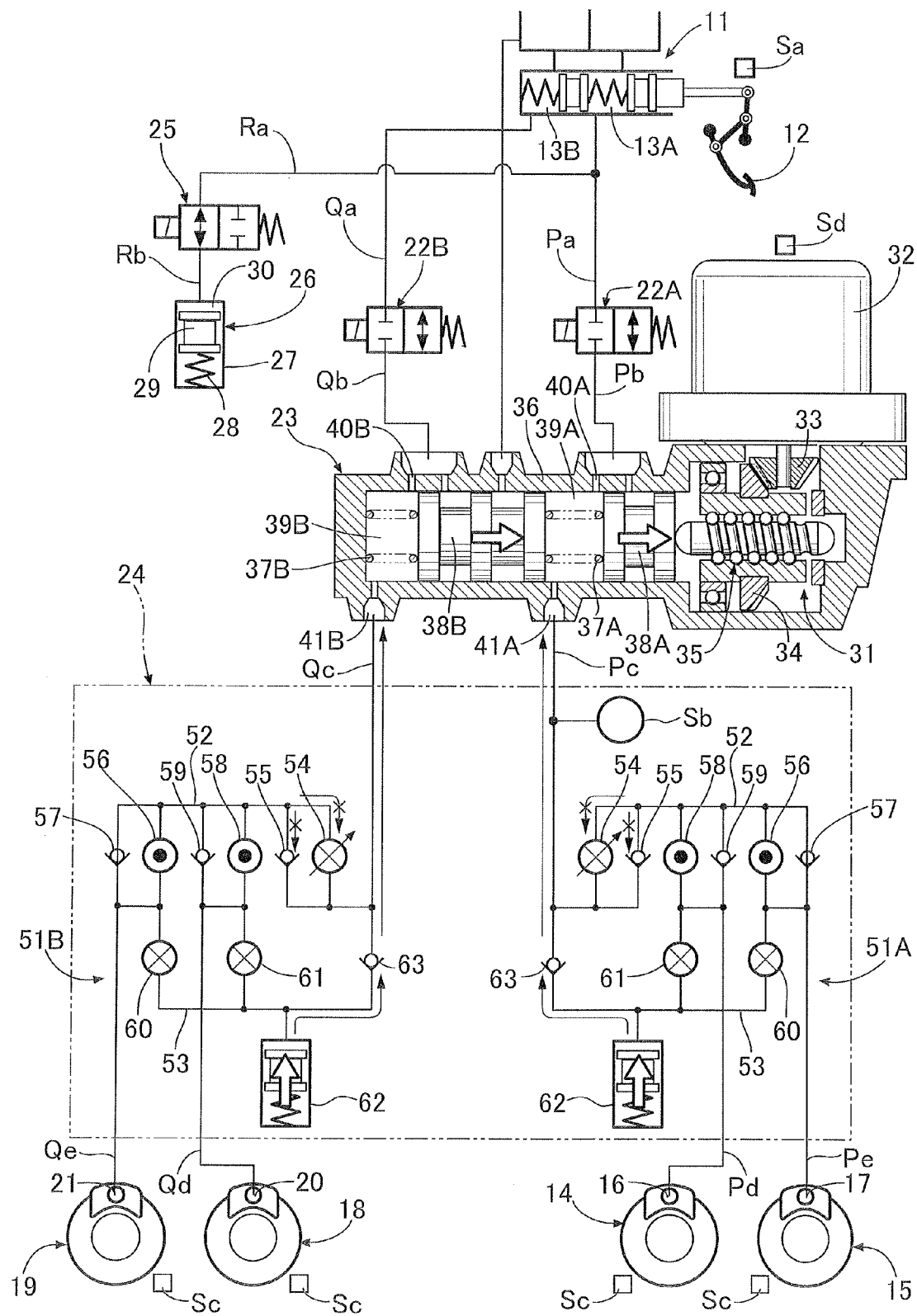
FIG. 4 is an operation explanatory view when an accumulator discharges brake fluid. (first embodiment)

Specifically, as shown in FIG. 4, the output of the electric motor 32 of the slave cylinder 23 is reduced in a state where the out-valves 60 and 60; 61 and 61 are deenergized and closed, and the regulator valves 54 and 54 are energized and closed. Then, the pressures of the brake fluids in the accumulators 62 and 62 are transmitted to the rear fluid pressure chamber 39A and the front fluid pressure chamber 39B of the slave cylinder 23 through the check valves 63 and 63. Thereby, the rear piston 38A and the front piston 38B recede while resisting the biasing forces of return springs 37A and 37B and the electric motor 32. Thus, the brake fluids in the accumulators 62 and 62 are discharged to the slave cylinder 23.

In this state, the brake fluid pressures of the wheel cylinders 16 and 17; 20 and 21 during braking are held by the check valves 55 and 55 and the closed regulator valves 54 and 54 and thus not reduced.

Incidentally, the fact that the slave cylinder 23 operates, and the brake fluids in the accumulators 62 and 62 are sent back to the slave cylinder 23 can be determined by monitoring the rotation angle of the electric motor 32 of the slave cylinder 23 by using a rotation angle sensor Sd.

As described above, according to this embodiment, the pumps for discharging the brake fluids stored in the accumulators 62 and 62 become unnecessary. Thus, it is possible to reduce the number of components, the weight and the costs.

Incidentally, assume the case that the rear and front output ports 41A and 41B of the slave cylinder 23 are connected directly to the plurality of wheel cylinders 16 and 17; 20 and 21 not through the regulator valves 54 and 54 and the check valves 63 and 63. In this case, the brake fluid pressures of the wheel cylinders 16 and 17; 20 and 21 fluctuate when one of the in-valves 56 and 56; 58 and 58 is opened. For this reason, the brake fluids in the accumulators 62 and 62 are desirably discharged by causing the slave cylinder 23 to operate in synchronization with the state in which all of the in-valves 56 and 56; 58 and 58 and the out-valves 60 and 60; 61 and 61 are closed, and the brake fluid pressures are thus maintained (the fluid pressure maintaining state of ABS control).

Here, the slave cylinder 23 is controlled on the basis of a "pressure"/"stroke" map so that a piston stroke corresponding to a predetermined brake fluid pressure would occur. In addition, assume the case that a pressure fluctuation occurs when the in-valves 56 and 56; 58 and 58 are opened after the out-valves 60 and 60; 61 and 61 are opened. In this case, the slave cylinder 23 is controlled so that the target stroke of the slave cylinder 23 would be corrected in accordance with the pressure fluctuation, and then, the target brake fluid pressure would be outputted again. Thus, the brake fluid pressures can be maintained without using the regulator valves 54 and 54 and the check valves 55 and 55 (see the area enclosed by the chained line in FIG. 3).

In addition, assume the case that it is determined that the accumulators 62 and 62 are full based on reduction in the recovery amount of the wheel speed at the time of pressure reduction of the ABS control. In this case, it is also possible to employ a configuration in which the slave cylinder 23 operates for a short period of time to discharge a minimum required amount of the brake fluids in the accumulators 62 and 62, and then ABS control is performed again.

Incidentally, if the slave cylinder 23 is inoperable due to an error in a power source or the like, braking is performed using a brake fluid pressure generated by the master cylinder 11 instead of a brake fluid pressure generated by the slave cylinder 23.

Figure 2:
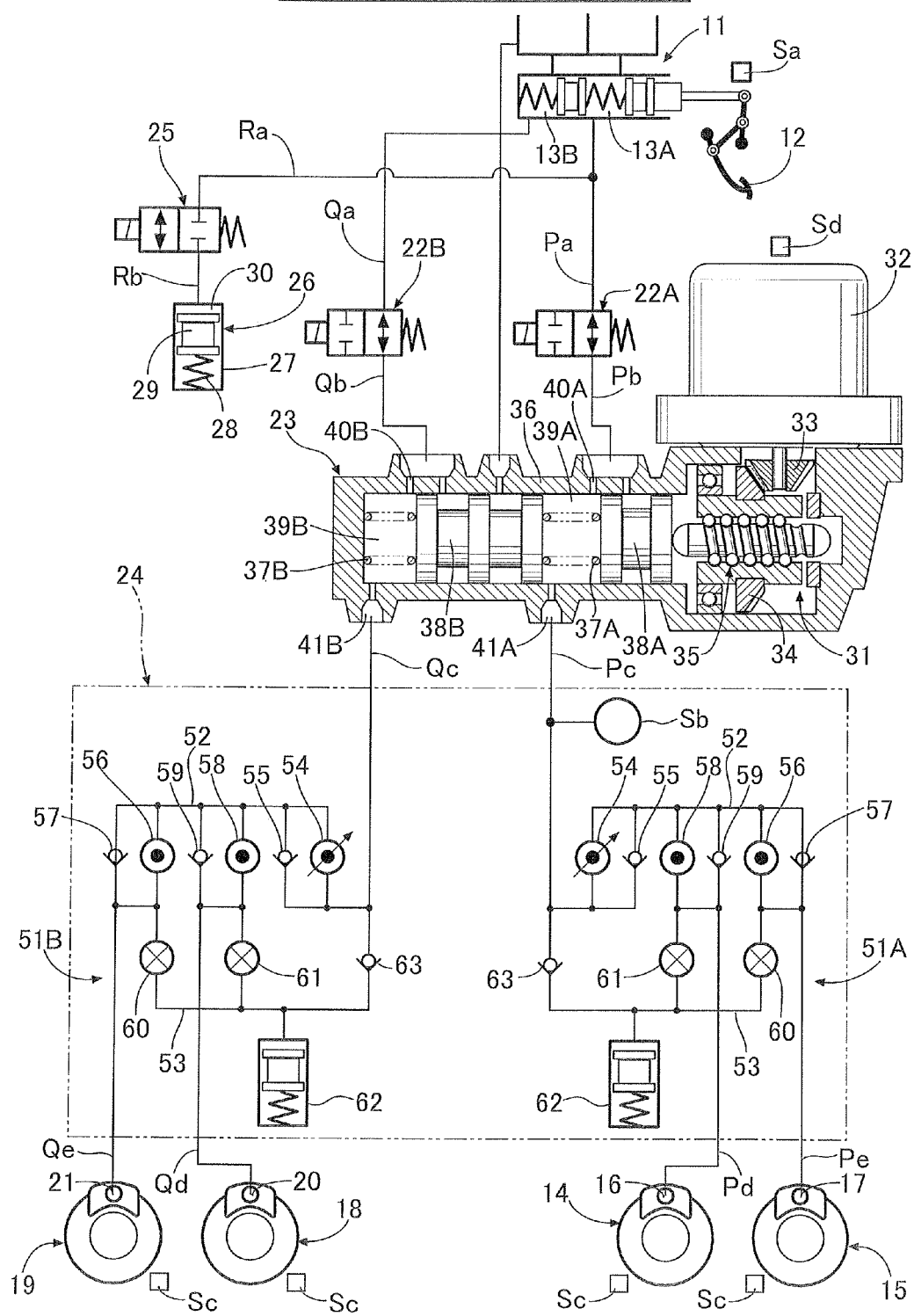
FIG. 2 is a diagram of a fluid pressure circuit, corresponding to FIG. 1, under an abnormal condition. (first embodiment)

Specifically, as shown in FIG. 2, when an error occurs in the power source, the cut-off valves 22A and 22B, which are normally open electromagnetic valves, are automatically opened and the reaction force allowing valve 25, which is a normally closed electromagnetic valve, is automatically closed. In this state, brake fluid pressures generated in the rear and front fluid pressure chambers 13A and 13B of the master cylinder 11 pass the rear fluid pressure chamber 39A and the front fluid pressure chamber 39B of the slave cylinder 23 without being absorbed into the stroke simulator 26. Thus, the brake fluid pressures operate the wheel cylinders 16 and 17; 20 and 21 of the disk brake devices 14 and 15; 18 and 19 for the wheels, and thereby braking forces can be generated without any problem.

The embodiment of the present invention has been described above. However, the present invention may be modified in a variety of ways as long as the modifications do not depart from the gist of the present invention.

For example, electric brake-fluid-pressure generation means of the present invention is not limited to the slave cylinder 23 in the embodiment.

Moreover, brake-fluid-pressure control means of the present invention is not limited to the VSA system 24 in the embodiment, and may be an ABS system obtained by eliminating the regulator valves 54 and 54 from the VSA system 24 and thus configured to perform only the ABS function. In this case, the in-valves 56 and 56; 58 and 58 rather than the regulator valves 54 and 54 correspond to second electromagnetic valves of the present invention.

The invention claimed is:

1. A vehicle brake device including:
a brake pedal for receiving a brake pedal stroke;
a wheel cylinder provided to a wheel and configured to generate a braking force by using a brake fluid pressure;
an electric brake-fluid-pressure generation apparatus for generating a brake fluid pressure to be supplied to the wheel cylinder, by being operated by an electric motor, said electric brake-fluid-pressure generation apparatus operable to carry out a brake-by-wire braking operation under normal operating conditions; and
a brake-fluid-pressure control mechanism for controlling vehicle behavior by individually controlling the brake fluid pressure supplied to the wheel cylinder, the brake-fluid-pressure control mechanism being disposed between the electric brake-fluid-pressure generation apparatus and the wheel cylinder,
characterized in that
the brake-fluid-pressure control mechanism is operable to selectively control operation of the electric brake-fluid-pressure generation apparatus based on either a manual operation of the brake pedal, or a supplemental brake assist operation which may be vehicle stability assist or antilock braking assist; and
the brake-fluid-pressure control mechanism includes:
an accumulator capable of communicating with the wheel cylinder and the electric brake-fluid-pressure generation apparatus;
a first electromagnetic valve configured to switch a communication state of a fluid path that connects the wheel cylinder to the accumulator; and
a check valve configured to allow only flowing of a brake fluid from the accumulator to the electric brake-fluid-pressure generation mechanism, and wherein the brake fluid is discharged from the accumulator to the electric brake-fluid-pressure generation apparatus by reducing a driving force of the electric motor of the electric brake-fluid-pressure generation apparatus based on control from the brake-fluid-pressure control mechanism.

2. The vehicle brake device according to claim 1, further comprising a second electromagnetic valve configured to switch a communication state of a fluid path that connects a path between the check valve and the electric brake-fluid-pressure generation apparatus to the wheel cylinder, wherein the brake-fluid-pressure control mechanism maintains the brake-fluid-pressure constant during opening and closing of the first electromagnetic valve and the second electromagnetic valve.

3. The vehicle brake device according to claim 1, wherein the electric brake-fluid-pressure generation apparatus includes a slave cylinder configured to generate a brake fluid pressure by driving a piston by using the electric motor, and controls the brake fluid pressure by changing a position of the piston.

4. The vehicle brake device according to claim 1, wherein the brake-fluid-pressure control mechanism includes: an in-valve disposed between the electric brake-fluid-pressure generation apparatus and the wheel cylinder; and an out-valve disposed between the wheel cylinder and the accumulator, and the electric brake-fluid-pressure generation apparatus reduces the driving force of the electric motor when the in-valve and the out-valve are both closed.

5. The vehicle brake device according to claim 1, wherein the electric brake-fluid-pressure generation apparatus is connected to a plurality of the wheel cylinders, and the vehicle brake device includes a second electromagnetic valve configured to cut the connection between the plurality of wheel cylinders and the electric brake-fluid-pressure generation apparatus when the driving force of the electric motor is reduced.

6. The vehicle brake device according to claim 1, further comprising a determination mechanism for determining discharge of a brake fluid pressure to the electric brake-fluid-pressure generation apparatus.

7. A vehicle brake device including:
a brake pedal for receiving a brake pedal stroke;
a wheel cylinder provided to a wheel and configured to generate a braking force by using a brake fluid pressure;
an electric brake-fluid-pressure generation apparatus for generating a brake fluid pressure to be supplied to the wheel cylinder, by being operated by an electric motor; and
a brake-fluid-pressure control mechanism for controlling vehicle behavior by individually controlling the brake fluid pressure supplied to the wheel cylinder, the brake-fluid-pressure control mechanism being disposed between the electric brake-fluid-pressure generation mechanism and the wheel cylinder,
characterized in that in normal operation:
the brake-fluid-pressure control mechanism is operable to selectively control operation of the electric brake-fluid-pressure generation apparatus either based on a manual operation of the brake pedal or on a supplemental brake assist operation which may be vehicle stability assist or antilock braking assist (ABS);
a target brake fluid pressure is selected based on a smaller of the pedal stroke, and a value indicated by the brake-fluid-pressure control mechanism according to a pedal-stroke/fluid-pressure map stored in computer non-volatile memory;
a target stroke of the electric brake-fluid-pressure generation apparatus is selected based on the target fluid pressure by using a fluid-pressure/slave-cylinder-stroke map stored in computer non-volatile memory; and
the target stroke is converted to a target rotation angle of the electric motor of the electric brake-fluid-pressure generation apparatus;
the electric motor is controlled so as to make the deviation between an actual rotation angle of the electric motor and the target rotation angle converge to zero;
such that the fluid pressure corresponding to the brake pedal stroke can be supplied to the wheel cylinders, and it is possible to accurately increase, decrease and maintain the fluid pressure based on the indicated value from the brake-fluid-pressure control mechanism.

8. The vehicle brake device according to claim 7, wherein:
the brake-fluid-pressure control mechanism comprises an accumulator capable of communicating with the wheel cylinder, and the electric brake-fluid-pressure generation apparatus; and
the vehicle brake device is configured such that if it determined during an ABS operation the accumulator is full based on the reduction in the recovery amount of the wheel speed at the time of pressure reduction under ABS control, the electric brake-fluid-pressure generation apparatus is operated for a short period of time to discharge a minimum required amount of brake fluid in the accumulator, and then ABS control is performed again.

* * * * *